US011524811B2

(12) United States Patent
Södergård et al.

(10) Patent No.: US 11,524,811 B2
(45) Date of Patent: Dec. 13, 2022

(54) SYSTEM AND METHOD FOR PRINTING AND APPLYING LABELS TO A RANDOM FLOW OF OBJECTS

(71) Applicant: Evolabel AB, Mölndal (SE)

(72) Inventors: Jonas Södergård, Västra Frölunda (SE); Gerard Dijkstra, Mölndal (SE)

(73) Assignee: Evolabel AB, Mölndal (SE)

( * ) Notice: Subject to any disclaimer, the term of this patent is extended or adjusted under 35 U.S.C. 154(b) by 0 days.

(21) Appl. No.: 17/284,338

(22) PCT Filed: Oct. 7, 2019

(86) PCT No.: PCT/SE2019/050973
§ 371 (c)(1),
(2) Date: Apr. 9, 2021

(87) PCT Pub. No.: WO2020/076223
PCT Pub. Date: Apr. 16, 2020

(65) Prior Publication Data
US 2021/0347515 A1 Nov. 11, 2021

(30) Foreign Application Priority Data
Oct. 9, 2018 (SE) .................................... 1851236-8

(51) Int. Cl.
*B32B 41/00* (2006.01)
*B65C 9/46* (2006.01)
(Continued)

(52) U.S. Cl.
CPC ................ *B65C 9/46* (2013.01); *B65C 1/025* (2013.01); *B65C 9/02* (2013.01); *B65C 9/40* (2013.01)

(58) Field of Classification Search
CPC .. B65C 9/46; B65C 1/025; B65C 9/02; B65C 9/40
(Continued)

(56) References Cited

U.S. PATENT DOCUMENTS 6,516,851 B1 2/2003 Thatcher et al.
2002/0084014 A1* 7/2002 Klein .................... B65C 9/1869 156/64
2010/0314024 A1* 12/2010 Chitraker .................. B65C 9/02 156/64

FOREIGN PATENT DOCUMENTS

EP 0103652 A1 3/1984
EP 3031736 A1 6/2016
(Continued)

OTHER PUBLICATIONS

International Search Report and Written Opinion received for PCT/SE2019/050973 dated Nov. 21, 2019.
(Continued)

*Primary Examiner* — Michael N Orlando
*Assistant Examiner* — Joshel Rivera
(74) *Attorney, Agent, or Firm* — Marshall, Gerstein & Borun LLP

(57) ABSTRACT

A system for printing and applying labels to a flow of objects, including a labelling unit, an object transporting device, an object detection sensor, and a control unit, wherein the labelling unit comprises a label printing unit for printing labels to be applied to the objects, wherein the object transporting device is transporting individual objects in a random flow to the labelling unit in an object transporting direction, wherein the object detection sensor is arranged upstream the labelling unit and is detecting a position of the objects when they are transported past the object detection sensor towards the labelling unit, wherein two directly after each other transported objects arranged on
(Continued)

the object transporting device are separated by a separation distance, wherein the separation distance is calculated by the control unit based on position detection by the object detection sensor of reference points between a preceding object and a directly subsequent object being transported on the object transporting device, wherein the label printing unit if the separation distance is equal to or less than a predetermined first trigger distance value is printing labels to be applied to the objects in a continuous printing mode, wherein the label printing unit if the separation distance is greater than the predetermined first trigger distance value, is printing labels to be applied to the objects in an intermittent printing mode.

20 Claims, 4 Drawing Sheets

(51) Int. Cl.

| | |
|---|---|
| ***B65C 1/02*** | (2006.01) |
| ***B65C 9/02*** | (2006.01) |
| ***B65C 9/40*** | (2006.01) |

(58) Field of Classification Search
USPC .................... 156/60, 64, 350, 351, 378, 379
See application file for complete search history.

(56) References Cited

FOREIGN PATENT DOCUMENTS

| | | | |
|---|---|---|---|
| JP | 2001122234 | A | 5/2001 |
| JP | 2001151214 | A | 6/2001 |
| KR | 20120019560 | A | 3/2012 |
| WO | WO-99/20533 | A1 | 4/1999 |
| WO | WO-2016/067050 | A2 | 5/2016 |
| WO | WO-2016/067050 | A3 | 6/2016 |

OTHER PUBLICATIONS

European Search Report, European Patent Application No. 19870544, dated Jun. 13, 2022.

* cited by examiner

SYSTEM AND METHOD FOR PRINTING AND APPLYING LABELS TO A RANDOM FLOW OF OBJECTS

TECHNICAL FIELD

The present disclosure relates to a system for printing and applying labels to a flow of objects, where the system comprises a labelling unit, an object transporting device, an object detection sensor, and a control unit. The labelling unit comprises a label printing unit for printing labels to be applied to the objects. The disclosure further concerns a method for printing and applying labels to a flow of objects.

BACKGROUND

Labelling units are commonly used in label print and apply systems, where labels are printed and applied to a flow of objects being transported on an object transporting device. The demand on efficiency and flexibility in such print and apply applications and systems are increasing, and labelling of objects in a random flow is an area where the labelling systems are complex and often inefficient due to the limited operational flexibility and low performance of traditional printing units.

There is thus a need for an improved system and an improved method for printing and applying labels to a flow of objects, where the printing operation is efficient, to meet the demand for flexible and fast printing operations.

SUMMARY

An object of the present disclosure is to provide a system and a method for printing and applying labels to a flow of objects where the previously mentioned problems are avoided. This object is at least partly achieved by the features of the independent claims. The dependent claims contain further developments of the system and the method for printing and applying labels to a flow of objects.

The disclosure concerns a system for printing and applying labels to a flow of objects, comprising a labelling unit, an object transporting device, an object detection sensor, and a control unit. The labelling unit comprises a label printing unit configured for printing labels to be applied to the objects. The object transporting device is configured for transporting individual objects in a random flow to the labelling unit in an object transporting direction. The object detection sensor is arranged upstream the labelling unit and is configured for detecting a position of the objects when they are transported past the object detection sensor towards the labelling unit. Two directly after each other transported objects arranged on the object transporting device are separated by a separation distance, where the separation distance is calculated by the control unit based on position detection by the object detection sensor of reference points between a preceding object and a directly subsequent object being transported on the object transporting device. If the separation distance is equal to or less than a predetermined first trigger distance value, the label printing unit is configured for printing labels to be applied to the objects in a continuous printing mode MC. If the separation distance is greater than the predetermined first trigger distance value, the label printing unit is configured for printing labels to be applied to the objects in an intermittent printing mode.

Advantages with these features are that the labelling system, where the objects to be labelled are transported in a random flow, can be made efficient and flexible compared to traditional label print and apply systems. A flexible printing output can be achieved with a high printing speed from the label printing unit when needed, since the label printing unit can operate in two different modes depending on the separation distance between two following objects that are transported on the object transporting device. With short separation distances between two objects below a certain distance value, a critical speed factor for the printing operation is the output of labels from the label printing unit. If the objects are closely arranged in relation to each other on the object transporting device, the system needs to manage the printing and application of labels without any interruptions in the labelling process. Traditional printing units are using interruptions in the printing operations even at higher speeds, and often the labels in the label printing unit are being reversed and positioned into a correct printing position between the printing operations. The continuous printing mode is further providing a higher average printing speed or throughput of labels due to the fact that there is no need for accelerating or retarding the labels between each printing operation, and in the continuous printing mode according to the disclosure the labels are not being reversed between the printing operations. A higher average printing speed gives shorter application distances in the labelling unit, which enables a more compact design of the labelling unit, since the need for buffering labels or label queuing is decreased. The intermittent printing mode is further providing the possibility with fine tuning or variable waiting times between the printing operations to ensure a higher flexibility in the labelling process with controlled positioning of labels on the objects.

According to an aspect of the disclosure, the label printing unit in the intermittent printing mode is configured for printing labels in subsequent label printing operations and pausing the printing of labels between each label printing operation. The pausing is providing an efficient printing when the separation distance is greater than the predetermined first trigger distance value and the printing of labels can be synchronized with the random flow of objects.

According to another aspect of the disclosure, each object passing the object detection sensor is the preceding object for the directly subsequent object following directly after the preceding object, where the separation distance is a measured distance calculated by the control unit based on position detection by the object detection sensor between reference points of each preceding object and each directly subsequent object being transported on the object transporting device.

According to an aspect of the disclosure, a continuous label printing output speed in the continuous printing mode is variable for printing the labels with different speeds, and the continuous label printing output speed in the continuous printing mode between a preceding label and a directly subsequent label is determined by the control unit depending on the separation distance between the preceding object and the directly subsequent object. The preceding label is allocated for the preceding object and the directly subsequent label is allocated for the directly subsequent object, where the directly subsequent label is printed directly after the preceding label. The continuous label printing output speed in the continuous printing mode between the preceding label and the directly subsequent label further is determined by the control unit depending on a transportation speed with which the individual objects are transported on the object transporting device. The control unit is using the separation distance and the transportation speed as input parameters to provide an efficient and flexible printing process in the continuous printing mode.

According to another aspect of the disclosure, the continuous label printing output speed in the continuous printing mode between the preceding label and the directly subsequent label is varied by the control unit depending on the separation distance between the preceding object and the directly subsequent object. With a variable speed an even more flexible printing process is achieved, where the labels can be printed with very high speeds if desired.

According to a further aspect of the disclosure, the continuous label printing output speed in the continuous printing mode between the preceding label and the directly subsequent label is varied by the control unit depending on the transportation speed. The transportation speed is used as an input parameter to the control unit for determining the varied printing output speed in the continuous printing mode.

According to an aspect of the disclosure, an intermittent label printing output speed in the intermittent printing mode between a preceding label and a directly subsequent label is determined by the control unit depending on the separation distance between the preceding object and the directly subsequent object. The preceding label is allocated for the preceding object and the directly subsequent label is allocated for the directly subsequent object, where the directly subsequent label is printed directly after the preceding label. The intermittent label printing output speed in the intermittent printing mode between the preceding label and the directly subsequent label further is determined by the control unit depending on a transportation speed with which the individual objects are transported on the object transporting device. The control unit is using the separation distance and the transportation speed as input parameters to provide an efficient and flexible printing process in the intermittent printing mode.

According to another aspect of the disclosure, the intermittent label printing output speed in the intermittent printing mode between the preceding label and the directly subsequent label is varied by the control unit depending on the separation distance between the preceding object and the directly subsequent object. With a variable speed an even more flexible printing process is achieved, where the labels depending on the separation distance can be printed with high speeds if desired also in the intermittent printing mode.

According to a further aspect of the disclosure, the intermittent label printing output speed in the intermittent printing mode between the preceding label and the directly subsequent label is varied by the control unit depending on the transportation speed. The transportation speed is used as an input parameter to the control unit for determining the varied printing output speed in the intermittent printing mode.

According to an aspect of the disclosure, the object detection sensor is arranged at a detection position, and a printing position in which the label printing unit is outputting printed labels to be applied to the objects transported on the object transporting device is located at a predetermined detection distance in the object transporting direction of the objects from the detection position.

According to another aspect of the disclosure, the labelling unit further comprises a label application unit configured for transporting the labels from the label printing unit to the objects and for applying the labels to the objects. The label application unit is used for an efficient application of labels to the objects.

According to a further aspect of the disclosure, the label printing unit in the intermittent printing mode if the separation distance is greater than a predetermined second trigger distance value, is configured for being deactivated into a low energy mode, where the predetermined second trigger distance value is greater than the predetermined first trigger distance value. The low energy mode is providing an energy efficient system with high flexibility, where the low energy mode is used for longer separation distances above the predetermined second trigger distance value.

The disclosure further concerns a method for printing and applying labels to a flow of objects with a system for printing and applying labels to a flow of objects as described above, where the method comprises the steps; printing labels, to be applied to the objects, in the label printing unit in a continuous printing mode if the separation distance is equal to or less than a predetermined first trigger distance value; printing labels, to be applied to the objects, in the label printing unit in an intermittent printing mode if the separation distance is greater than the predetermined first trigger distance value. The method is, where the objects to be labelled are transported in a random flow, providing an efficient and flexible printing operation compared to traditional label print and apply operations. A flexible printing output can be achieved with a high printing speed from the label printing unit when needed, since the label printing unit can operate in two different modes depending on the separation distance between two following objects that are transported on the object transporting device.

According to an aspect of the disclosure, the label printing unit in the intermittent printing mode is printing labels in subsequent label printing operations, where the method further comprises the step; pausing the printing of labels between each label printing operation in the intermittent printing mode. The pausing is providing an efficient and flexible operation of the printing process.

BRIEF DESCRIPTION OF DRAWINGS

The disclosure will be described in greater detail in the following, with reference to the attached drawings, in which.

DESCRIPTION OF EXAMPLE EMBODIMENTS

Figure 1:
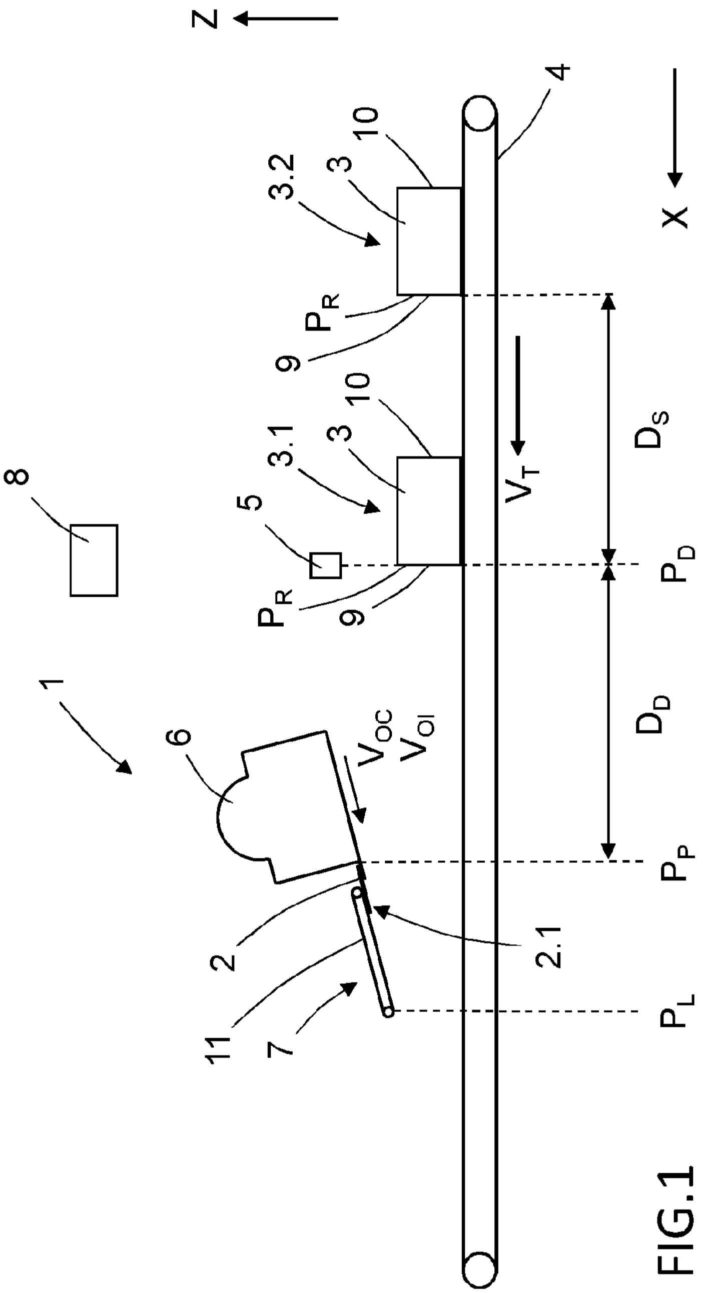
FIG. 1 shows schematically, a side view of a system for printing and applying labels to a flow of objects according to the disclosure, where two objects are transported on an object transporting device in a first transporting position.

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

In FIGS. 1-4, a system for printing and applying labels 2 to a flow of objects 3 is shown. The system comprises a labelling unit 1, an object transporting device 4, an object detection sensor 5, and a control unit 8. The labelling unit 1 comprises a label printing unit 6 for printing the labels 2 to be applied to the objects 3.

The objects 3 could be any types of products or goods that should be labelled or marked and typically the objects 3 are in the form of boxes or other types of products that are transported on the object transporting device 4.

The labels 2 could be of any suitable type, and as described above, the labels 2 to be applied to the objects 3 are printed in the label printing unit 6 of the labelling unit 1. Often self-adhesive labels are used, where the labels in a conventional way are provided with an adhesive layer on one side and carried by a paper web or similar backing structure that is holding the labels spaced apart. Also linerless labels without backing structure may be used if desired.

The control unit 8 is connected with suitable means to necessary parts and components of the system, such as for example the labelling unit 1, the object transporting device 4, and the object detection sensor 5. The control unit 8 is controlling the system and all operations performed by the system.

The object transporting device 4 is transporting individual objects 3 in a random flow to the labelling unit 1 in an object transporting direction X. With a flow of objects is meant a flow of two or more objects 3 that are transported after each other on the object transporting device 4 in the object transporting direction X. With a random flow of objects is meant a flow of two or more objects 3 that are transported after each other on the object transporting device 4 in the object transporting direction X, where the distances between the two or more objects may be varying depending on when the objects are positioned or placed on the object transporting device 4. It is common when labelling objects 3 that the distance between two objects 3 that are transported to the labelling unit 1 is not exactly the same and many times the distance between two objects may vary to a high degree. This distance may for example depend on when the objects are placed on the object transporting device 4. It is common that the objects are transported to the labelling system from another transporting arrangement or alternatively placed manually on the object transporting device 4.

The object transporting device 4 may be any suitable transporting device for transporting the individual objects 3 in a random flow to the labelling unit 1 in the object transporting direction X. In the embodiment shown in the figures, the object transporting device 4 is a conventional conveyor belt that is driven by a suitable drive unit. The drive unit may for example be an electric motor, and the type of electric motor can be chosen to fit the specific design of the conveyor belt. In the embodiment shown in FIGS. 1-4, the object transporting direction X is a direction along the conveyor belt as indicated in the figures.

The object detection sensor 5 is arranged upstream the labelling unit 1 and is detecting a position of the objects 3 when they are transported past the object detection sensor 5 towards the labelling unit 1, as shown in FIGS. 1-4. The object detection sensor 5 may be any suitable type of sensor used for detecting objects that are moving on a transporting device, such as for example an optical sensor, a magnetic sensor, an ultrasonic sensor, a photoelectric sensor, a capacitive sensor, an inductive sensor, a pneumatic sensor, an electro-mechanical sensor, or a combination of different sensors. The type of sensor used may vary depending on the type of objects 3 being transported on the object transporting device 4. When a position of an object 3 is detected by the object detection sensor 5, a signal is sent to the control unit 8, indicating that an object is being transported past the object detecting sensor 5 in the object transporting direction X. As shown in the figures, the object detection sensor 5 is arranged above the objects 3. In alternative embodiments the object detection sensor 5 may have other positions in relation to the objects 3 to be detected, such as for example below or besides the objects 3.

Depending on the type of objects 3 being transported, the object detection sensor 5 may be calibrated to detect a specific point on the object, such as a leading edge 9, as shown in the figures. Alternatively, the object detection sensor 5 may detect a trailing edge 10 of the objects 3 or another suitable point, line, side, edge or area on the objects 3. The suitable detected point, line, side, edge or area on the object 3 is defined as the reference point PR.

Figure 2:
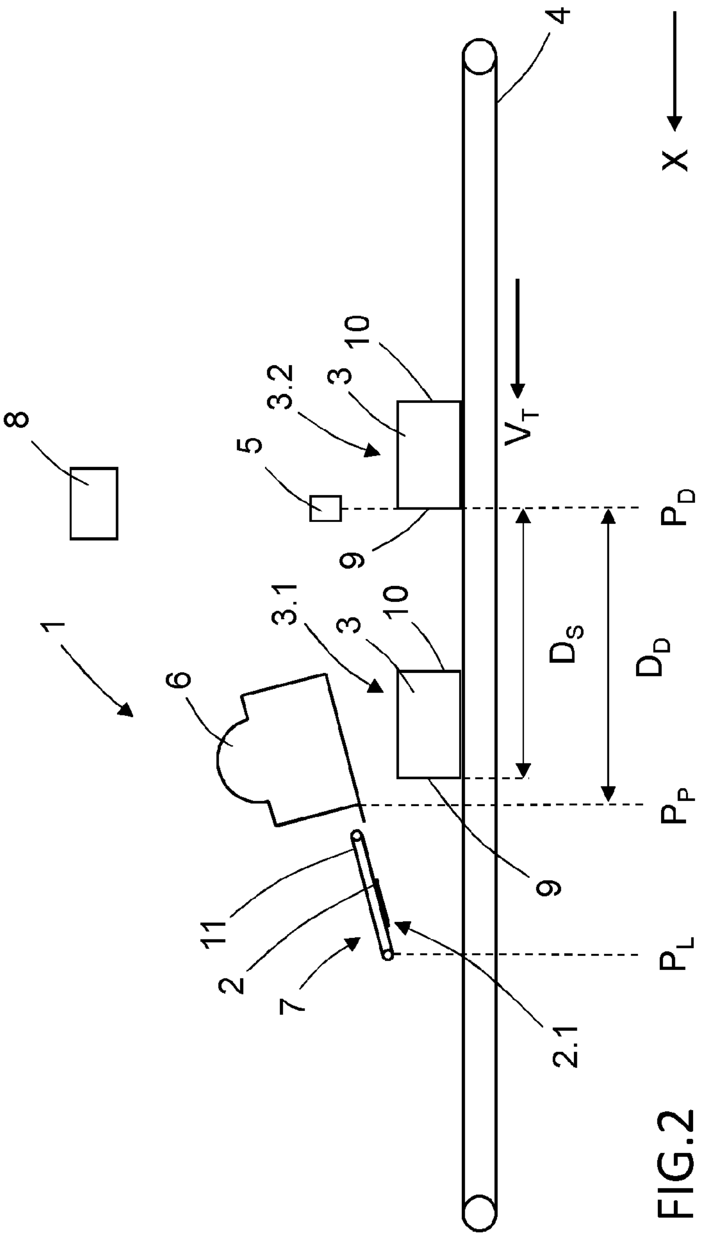
FIG. 2 shows schematically, a side view of the system for printing and applying labels to a flow of objects according to the disclosure, where two objects are transported on the object transporting device in a second transporting position.
Figure 3:
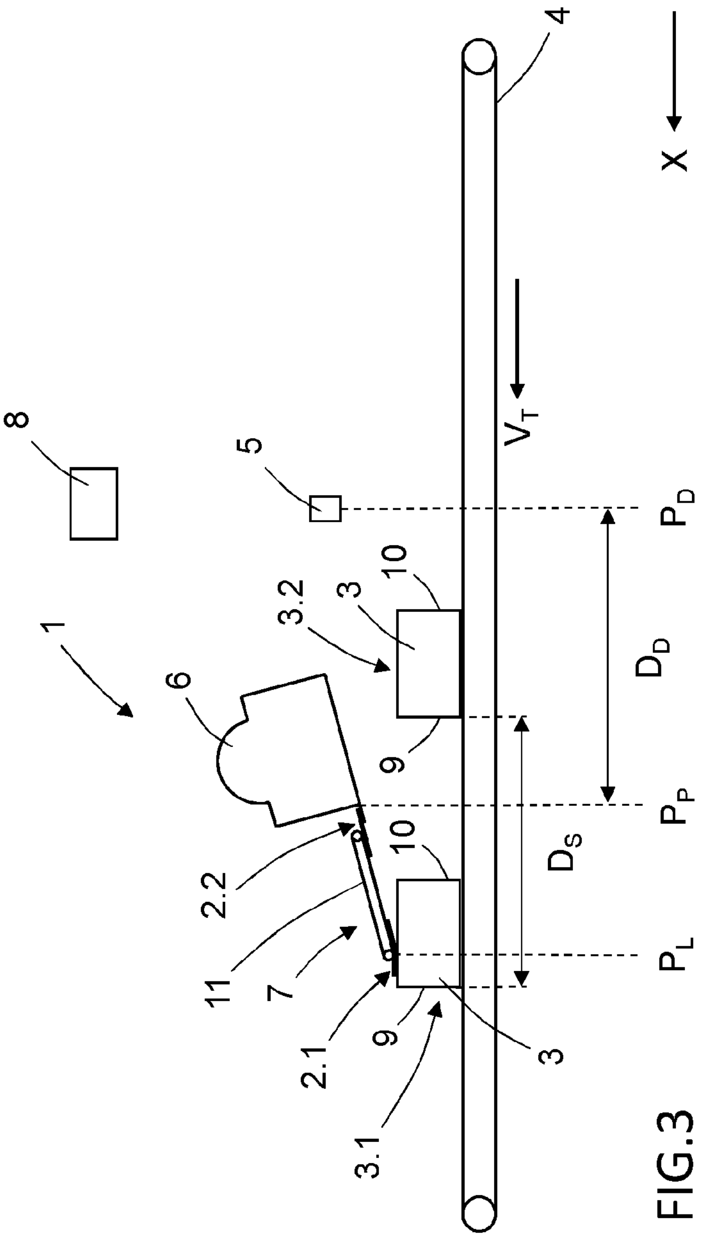
FIG. 3 shows schematically, a side view of the system for printing and applying labels to a flow of objects according to the disclosure, where two objects are transported on the object transporting device in a third transporting position.

As described above, two or more objects are transported after each other on the object transporting device 4, and as shown in FIGS. 1-3 two directly after each other transported objects 3 are arranged on the object transporting device 4 and separated by a separation distance DS. The separation distance DS is calculated by the control unit 8. The calculation is based on the position detection by the object detection sensor 5 of the reference points PR between a preceding object 3.1 and a directly subsequent object 3.2 being transported on the object transporting device 4, as schematically illustrated in FIGS. 1-3. The directly subsequent object 3.2 is thus following directly after the preceding object 3.1 when being transported on the object transporting device 4 in the object transporting direction X. In the embodiment shown in FIGS. 1-3, the leading edges 9 of the objects 3 are used as the reference points PR.

Each object 3 passing the object detection sensor 5 is the preceding object 3.1 for the directly subsequent object 3.2, which directly subsequent object 3.2 is following directly after the preceding object 3.1, as shown in FIGS. 1-3. The separation distance DS is a measured distance calculated by the control unit 8 based on the position detection by the object detection sensor 5 between the reference points PR of each preceding object 3.1 and each directly subsequent object 3.2 being transported on the object transporting device 4.

Figure 4:
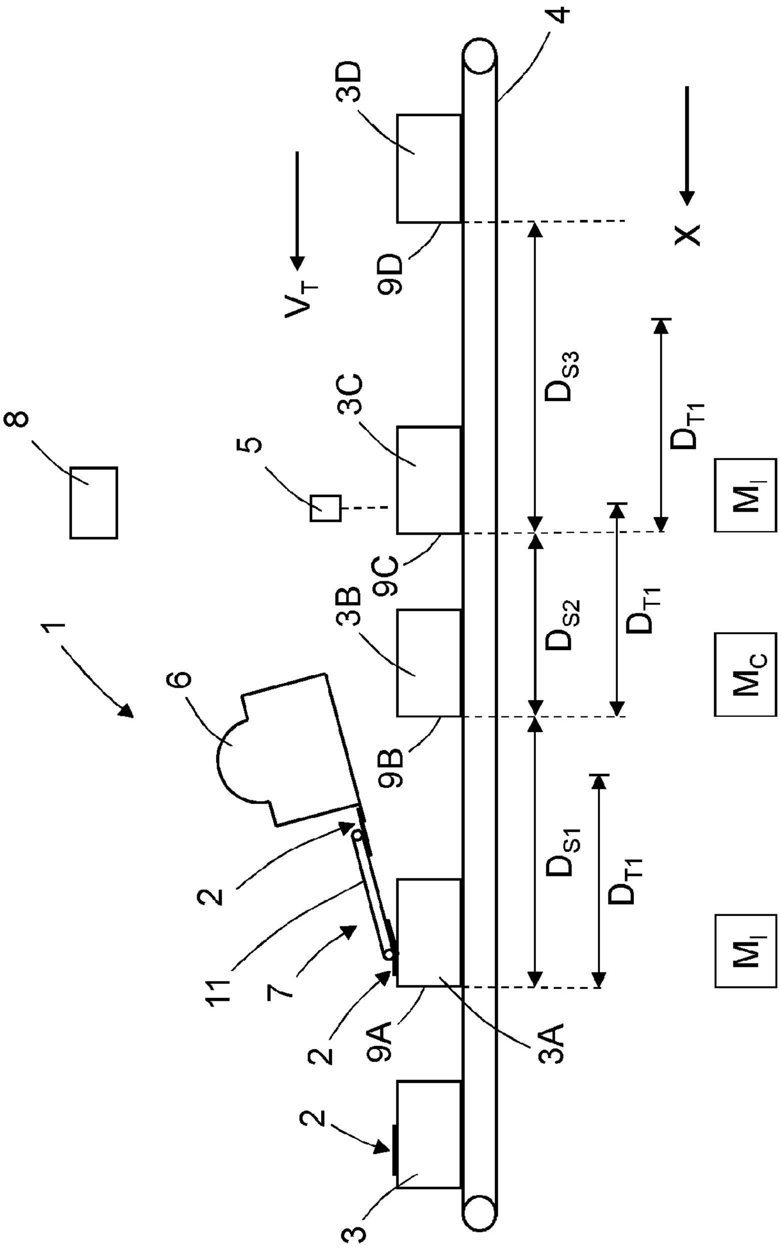
FIG. 4 shows schematically, a side view of the system for printing and applying labels to a flow of objects according to the disclosure, where a number of objects are transported on the object transporting device.

As shown in FIG. 4, the separation distance DS may vary between different objects 3 in the random flow of objects. In the figure, one labelled object 3 and four unlabelled objects 3A-3D are illustrated in a random flow of objects.

A first separation distance DS1 is arranged between a first unlabelled object 3A and a second unlabelled object 3B, as shown in FIG. 4. The first separation distance DS1 is in this example embodiment the distance between a leading edge 9A of the first unlabelled object 3A and a leading edge 9B of the second unlabelled object 3B. The first unlabelled object 3A is a preceding object for the second unlabelled object 3B, which second unlabelled object 3B is a directly subsequent object in relation to the first unlabelled object 3A.

A second separation distance DS2 is arranged between the second unlabelled object 3B and a third unlabelled object 3C, as shown in FIG. 4. The second separation distance DS2 is in this example embodiment the distance between the leading edge 9B of the second unlabelled object 3B and a leading edge 9C of the third unlabelled object 3C. The second unlabelled object 3B is a preceding object for the third unlabelled object 3C, which third unlabelled object 3C is a directly subsequent object in relation to the second unlabelled object 3B.

A third separation distance DS3 is arranged between the third unlabelled object 3C and a fourth unlabelled object 3D, as shown in FIG. 4. The third separation distance DS3 is in this example embodiment the distance between the leading edge 9C of the third unlabelled object 3C and a leading edge 9D of the fourth unlabelled object 3D. The third unlabelled object 3C is a preceding object for the fourth unlabelled object 3D, which fourth unlabelled object 3D is a directly subsequent object in relation to the third unlabelled object 3C.

As illustrated in FIG. 4, the first separation distance DS1, the second separation distance DS2, and the third separation distance DS3, are different from each other, which is characterizing the random flow of objects. In a random flow, the separation distances may vary to high degree, and sometimes the separation distances between different objects may be equal or essentially equal depending on when and how the objects are positioned on the object transporting device 4. The different objects 3 are detected by the object detection sensor 5 and when passing the object detection sensor 5, the control unit 8 is calculating the separation distances between the objects 3 in the random flow of objects.

To achieve a flexible printing output with a high printing speed from the label printing unit 6 when needed, the label printing unit 6 can operate in two different modes depending on the separation distance DS between two following objects that are transported on the object transporting device 4. With short separation distances DS between two objects below a certain distance value, a critical speed factor for the printing operation is the output of labels 2 from the label printing unit 6. If the objects 3 are closely arranged in relation to each other on the object transporting device 4, the system needs to manage the printing and application of labels 2 without any issues or interruptions in the labelling process.

According to the disclosure, the label printing unit 6 is if the separation distance DS is equal to or less than a predetermined first trigger distance value DT1 printing labels 2 to be applied to the objects 3 in a continuous printing mode MC. Further, the label printing unit 6 is if the separation distance DS is greater than the predetermined first trigger distance value DT1 printing labels 2 to be applied to the objects 3 in an intermittent printing mode MI.

The first trigger distance value DT1 is a selected value that may be dependent on many different factors, such as for example the type of label printing unit 6 used and the type of labels 2 being printed. The maximum printing speed is determining how fast a label 2 can be printed, and the time needed for printing a label 2 is dependent on the printing speed, the size of the label 2, and also on how the labels are arranged in relation to each other in the label printing unit 6, for example on the paper web or backing structure holding the labels spaced apart. Another factor that is impacting the first trigger distance value DT1 is for example a transportation speed VT with which the objects 3 are transported on the object transporting device 4. It should be understood that the labels may be printed at a different speed than the maximum printing speed.

In the continuous printing mode MC, where the separation distance DS is equal to or less than the predetermined first trigger distance value DT1, the label printing unit 6 is printing labels 2 in subsequent label printing operations without any pauses between the label printing operations, which means that at least two labels 2 are printed after each other without any interruptions between the printings of two subsequent labels 2. This is an efficient mode for fast label printing operations, where the label printing unit 6 is arranged to print the labels 2 continuously. The speed with which the labels 2 are printed in the continuous printing mode MC may be varied, but never be interrupted or have a zero speed. This further means that the labels 2 in this mode are being output from the label printing unit 6 in a flow without any interruptions, and thus in a continuous sequence without interruptions between the printing of each label 2.

In the intermittent printing mode MI, where the separation distance DS is greater than the predetermined first trigger distance value DT1, the label printing unit 6 is printing labels 2 in subsequent label printing operations and is pausing the printing of labels 2 between each subsequent label printing operation. In the intermittent printing mode MI, at least two labels 2 are printed after each other with an interruption between the printings of two subsequent labels 2. This further means that the labels 2 in this mode are being output from the label printing unit 6 in a flow with pauses between the printing of subsequent labels 2, and that the labels 2 are printed in an intermittent sequence with a temporary interruption between the printing operations of subsequent labels 2. This is a suitable mode for label printing operations, where the time between the deliveries or outputs of two subsequent labels from the label printing unit 6 could be longer. The speed with which the labels 2 are printed in the intermittent printing mode MI may be varied.

The intermittent printing mode MI is for example used when the printing operation for two subsequent labels 2 cannot be accomplished with a lowest printing speed of the label printing unit 6. The intermittent printing mode MI can also be used at printing speeds higher than the lowest printing speed of the label printing unit 6. The time between two subsequent printing operations in the intermittent printing mode MI may vary depending on for example the printing speed used in the label printing unit 6 and the separation distance DS between the transported objects 3.

For a specific system, the first trigger distance value DT1 is determined, based for example on the different factors described above. When the separation distance DS is equal to or less than the predetermined first trigger distance value DT1, the labels 2 to be applied to the objects 3 are printed in the continuous printing mode MC. When the separation distance DS is greater than the predetermined first trigger distance value DT1, the labels 2 to be applied to the objects 3 are printed in the intermittent printing mode MI. The first trigger distance value DT1 may differ between different labelling processes and labelling system designs, and suitable distance values may be decided by the labelling system operator or by the labelling system configurator.

The control unit 8 may be used for determining the printing speed of the labels 2 in the different printing modes, and the printing speed in the continuous printing mode MC may be determined based on different input parameters. A continuous label printing output speed VOC in the continuous printing mode MC between a preceding label 2.1 and a directly subsequent label 2.2, as for example illustrated in FIG. 3, is determined by the control unit 8 depending on the separation distance DS between the preceding object 3.1 and the directly subsequent object 3.2 as an input parameter. The preceding label 2.1 is allocated for the preceding object 3.1 and the directly subsequent label 2.2 is allocated for the directly subsequent object 3.2, where the directly subsequent label 2.2 is printed directly after the preceding label 2.1. Further, the continuous label printing output speed VOC may be depending on the transportation speed VT with which the individual objects 3 are transported on the object transporting device 4, as another input parameter.

The printing speed in the continuous printing mode MC may be variable, where the labels 2 can be printed with different speeds depending on the operational conditions of the system. The continuous label printing output speed VOC in the continuous printing mode MC between the preceding label 2.1 and the directly subsequent label 2.2 may be varied by the control unit 8 depending on the separation distance DS between the preceding object 3.1 and the directly subsequent object 3.2, as an input parameter. The continuous label printing output speed VOC in the continuous printing mode MC between the preceding label 2.1 and the directly subsequent label 2.2 may further be varied by the control unit 8 depending on the transportation speed VT, as an input parameter.

The printing speed in the intermittent printing mode MI may also be determined based on different input parameters by the control unit 8. In an intermittent label printing output speed VOI in the intermittent printing mode MI between a preceding label 2.1 and a directly subsequent label 2.2, as for example illustrated in FIG. 3, is determined by the control unit 8 depending on the separation distance DS between the preceding object 3.1 and the directly subsequent object 3.2 as an input parameter. In the same way as described in relation to the continuous printing mode, the preceding label 2.1 is allocated for the preceding object 3.1 and the directly subsequent label 2.2 is allocated for the directly subsequent object 3.2, where the directly subsequent label 2.2 is printed directly after the preceding label 2.1. Further, the intermittent label printing output speed VOI, may be depending on the transportation speed VT with which the individual objects 3 are transported on the object transporting device 4, as another input parameter.

The printing speed in the intermittent printing mode MI may be variable, where the labels 2 can be printed with different speeds depending on the operational conditions of the system. The intermittent label printing output speed VOI in the intermittent printing mode MI between the preceding label 2.1 and the directly subsequent label 2.2 may be varied by the control unit 8 depending on the separation distance DS between the preceding object 3.1 and the directly subsequent object 3.2 as an input parameter. The intermittent label printing output speed VOI in the intermittent printing mode MI between the preceding label 2.1 and the directly subsequent label 2.2 may also be varied by the control unit 8 depending on the transportation speed VT as an input parameter.

According to the disclosure, the object detection sensor 5 is arranged at a detection position PD. The detection position PD is a position where the object detection sensor 5 is detecting the objects 3 arranged on the object transporting device 4 and moving in the object transporting direction X. As shown in the figures, the detection position PD is arranged upstream the labelling unit 1. Further, a printing position PP in which the label printing unit 6 is outputting printed labels 2 to be applied to the objects 3 transported on the object transporting device 4 is located at a predetermined detection distance DD in the object transporting direction X of the objects 3 from the detection position PD. As shown in the figures, the printing position PP is a position where the labels are being output from the label printing unit 6, for example in connection to a printing head or a label output unit arranged in the label printing unit 6. The detection distance DD may be determined based on different factors, such as for example the printing speed of the label printing unit, the printing time for printing a specific label, and the transportation speed VT of the objects 3 arranged on the object transporting device 4.

The labelling unit 1 further comprises a label application unit 7 for transporting the labels 2 from the label printing unit 6 to the objects 3 and for applying the labels 2 to the objects 3.

The labelling unit 1 is as described above a print and apply unit, where the labelling unit 1 comprises the label printing unit 6 for printing the labels 2, and the label application unit 7. The label application unit 7 is transporting the labels 2 from the label printing unit 6 to the objects 3 and further applying the labels 2 on the objects 3. The labels 2 can for example be transported to and applied to the objects 3 with a conventional type of label application unit 7, such as a belt applicator system 11 as shown in the figures. As an alternative, the label application unit 7 may instead be arranged as movable arms, a pneumatic applicator device, or other suitable label applicator arrangements.

The objects 3 that are passing the labelling unit 1 may vary in size and therefore the position of the labelling unit 1 may be altered depending on the size of the objects 3. The object transporting device 4 is in the embodiments shown in the figures arranged in a position below the labelling unit 1 and to achieve a correct labelling position PL of the labelling unit 1 in relation to the objects 3, the labelling unit 1 may be adjustable in a vertical direction Z, and also in the object transporting direction X. The correct labelling position PL is a position suitable for the application of labels 4 on the objects 3, and may vary depending on the type of objects 3 and also on which side or end of the objects 3 the labels 2 are applied. The labelling position PL can be manually determined by a system operator or as an alternative automatically by a sensor unit connected to the labelling machine. The labelling unit 1 may for example be attached to a movable stand that is used for repositioning the labelling unit 1.

The label printing unit 6 in the intermittent printing mode MI is if the separation distance DS is greater than a predetermined second trigger distance value DT2 deactivated into a low energy mode MLE. The predetermined second trigger distance value DT2 is greater than the predetermined first trigger distance value DT1. The low energy mode MLE is used for very long separation distances DS, where the label printing unit 6 can be put into a sleep mode or similar function, where the energy consumption of the label printing unit is low. The predetermined second trigger distance value DT2 may differ between different labelling processes and system designs, and suitable distance values may be decided by the labelling system operator or by the labelling system configurator.

With the system for printing and applying labels 2 to a flow of objects 3 described above, the separation distance DS is determining the mode for printing the labels, where labels 2 to be applied to the objects 3 are printed in the label printing unit 6 in a continuous printing mode MC if the separation distance DS is equal to or less than a predetermined first trigger distance value DT1, and where labels 2 to be applied to the objects 3 are printed in the label printing unit 6 in an intermittent printing mode MI if the separation distance DS is greater than the predetermined first trigger distance value DT1. In the intermittent printing mode MI, the label printing unit 6 is printing labels in subsequent label printing operations, where the printing of labels 2 is paused between each label printing operation in the intermittent printing mode MI.

In FIG. 1, the two objects 3 in the example embodiment shown are in a first transporting position, where the leading edge 9 of the preceding object 3.1 is detected by the object detection sensor 5. After a certain time period, the two objects have moved along the object transporting device 4 in the object transporting direction X to a second transporting position, as shown in FIG. 2, where the leading edge 9 of the directly subsequent object 3.2 is detected by the object detection sensor 5. Based on the transportation speed of the objects on the object transporting device, the control unit 8 is calculating the separation distance DS between the preceding object 3.1 and the directly subsequent object 3.2. The calculated separation distance DS is compared with the predetermined first trigger distance value DT1.

If the calculated separation distance DS is equal to or less than the predetermined first trigger distance value DT1, the preceding label 2.1 for the preceding object 3.1 and the directly subsequent label 2.2 for the directly subsequent object 3.2 are printed in the continuous printing mode MC without any interruption between the printing operations for the two labels. In FIG. 3, the two objects have moved further along the object transporting device 4 in the object transporting direction X to a third transporting position. In the third transporting position the preceding object 3.1 is in a labelling position PL downstream the printing position PP where the preceding label 2.1 can be applied to the preceding object 3.1 by the label application unit 7. When the preceding object 3.1 has been labelled, the directly subsequent object 3.2 is being labelled with the directly subsequent label 2.2 in a subsequent labelling operation when the directly subsequent object 3.2 is in the suitable labelling position PL in relation to the label application unit 7.

If the calculated separation distance DS is greater than the predetermined first trigger distance value DT1, the preceding label 2.1 for the preceding object 3.1 and the directly subsequent label 2.2 for the directly subsequent object 3.2 are printed in the intermittent printing mode MI with an interruption between the printing operations for the two labels. In the same way as described in relation to the continuous printing mode above, the two objects have, as shown in FIG. 3, moved further along the object transporting device 4 in the object transporting direction X to a third transporting position. In the third transporting position the preceding object 3.1 is in a labelling position PL downstream the printing position PP where the preceding label 2.1 can be applied to the preceding object 3.1 by the label application unit 7. When the preceding object 3.1 has been labelled, the directly subsequent object 3.2 is being labelled with the directly subsequent label 2.2 in a subsequent labelling operation when the directly subsequent object 3.2 is in the suitable labelling position PL in relation to the label application unit 7.

The system is when a number of objects 3 are arranged on the object transporting device 4 in a random flow of objects 3 shifting between the continuous printing mode MC and the intermittent printing mode MI, depending on the separation distance DS between the objects 3 determined by the control unit 8.

In the example embodiment schematically illustrated in FIG. 4, the first separation distance DS1 between the first unlabelled object 3A and the second unlabelled object 3B, is greater than the predetermined first trigger distance value DT1. The printing unit will thus for the first unlabelled object 3A and the second unlabelled object 3B operate in the intermittent printing mode MI, and the label printing unit 6 is printing labels 2 in subsequent label printing operations and is pausing the printing of labels 2 between the first unlabelled object 3A and the second unlabelled object 3B. The second separation distance DS2 between the second unlabelled object 3B and the third unlabelled object 3C, is less than the predetermined first trigger distance value DT1. The printing unit will thus for the second unlabelled object 3B and the third unlabelled object 3C operate in the continuous printing mode MC, and the label printing unit 6 is printing labels 2 in subsequent label printing operations without pausing the printing of labels 2 between the second unlabelled object 3B and the third unlabelled object 3C. The third separation distance DS3 between the third unlabelled object 3C and the fourth unlabelled object 3D, is greater than the predetermined first trigger distance value DT1. The printing unit will thus for the third unlabelled object 3C and the fourth unlabelled object 3D operate in the intermittent printing mode MI, and the label printing unit 6 is printing labels 2 in subsequent label printing operations and is pausing the printing of labels 2 between the third unlabelled object 3C and the fourth unlabelled object 3D.

The control unit 8 may be of any suitable type, and may comprise a processing circuitry with at least one processor, at least one storage unit for storing instruction sets used in the processor and for storing data, and at least one sensor interface connected to the object detection sensor 5. The processor may comprise a capturing unit for capturing sensor data. The processor is arranged to execute instruction sets stored in a memory for executing operation steps of the system. The processor may for instance be a microprocessor, digital signal processor, graphical processing unit (GPU), embedded processor, field programmable gate array (FPGA), or ASIC (Application specific integrated circuit). The storage unit may be volatile or non-volatile computer readable memory and arranged to store instructions for execution by the processor. Instruction sets are preferably stored in a non-volatile memory such as solid state (SSD) or disk drive hard disk, flash memory, or memory card. The storage unit may also comprise a combination of storage types.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Labelling unit
2: Labels
3: Objects
4: Object transporting device
5: Object detection sensor

6: Label printing unit
7: Label application unit
8: Control unit
9: Leading edge
10: Trailing edge
11: Belt applicator system

The invention claimed is:

1. A system for printing and applying labels to a flow of objects, the system comprising:

a labelling unit,
an object transporting device,
an object detection sensor, and
a control unit, wherein the labelling unit comprises a label printing unit configured for printing labels to be applied to the objects, wherein the object transporting device is configured for transporting individual objects in a random flow to the labelling unit in an object transporting direction, wherein the object detection sensor is arranged upstream of the labelling unit and is configured for detecting a position of the objects when they are transported past the object detection sensor towards the labelling unit, wherein the control unit is configured to calculate a separation distance separating a first one of the objects being transported on the object transporting device from a second one of the objects being transported on the object transporting device directly after the first object, wherein the separation distance is calculated by the control unit based on position detection by the object detection sensor of reference points between the first object and the second object, wherein if the control unit calculates that the separation distance is equal to or less than a predetermined first trigger distance value, the control unit causes the label printing unit to operate in a continuous printing mode for printing labels to be applied to the objects, wherein if the control unit calculates that the separation distance is greater than the predetermined first trigger distance value, the control unit causes the label printing unit to operate in an intermittent printing mode for printing labels to be applied to the objects, and wherein regardless of whether the label printing unit is operating in the continuous printing mode or the intermittent printing mode, the control unit causes the object transporting device to continue transporting the individual objects in the object transporting direction.

2. A system according to claim 1, wherein when the control unit causes the label printing unit to operate in the continuous printing mode, the label printing unit is configured to print labels in subsequent label printing operations without pausing between each of the subsequent label printing operations, and wherein when the control unit causes the label printing unit to operate in the intermittent printing mode, the label printing unit is configured to print labels in subsequent label printing operations while pausing between each of the subsequent label printing operations.

3. A system according to claim 1, wherein when the control unit causes the label printing unit to operate in the continuous printing mode, the label printing unit is configured to print labels at a continuous label printing output speed, and wherein the control unit is configured to determine the continuous label printing output speed depending on the separation distance between the first object and the second object.

4. A system according to claim 3, wherein the control unit is configured to vary the continuous label printing output speed based on the separation distance between the first object and the second object.

5. A system according to claim 4, wherein the control unit is configured to vary the continuous label printing output speed based on a transportation speed at which the objects are transported on the object transporting device.

6. A system according to claim 1, wherein when the control unit causes the label printing unit to operate in the intermittent printing mode, the label printing unit is configured to print labels at an intermittent label printing output speed.

7. A system according to claim 6, wherein the control unit is configured to vary the intermittent label printing output speed based on the separation distance between the first object and the second object.

8. A system according to claim 6, wherein the control unit is configured to vary the intermittent label printing output speed based on a transportation speed at which the objects are transported on the object transporting device.

9. A system according to claim 1, wherein the object detection sensor is arranged at a detection position, and wherein the label printing unit is configured to print labels at a printing position that is located a predetermined detection distance from the detection position in the object transporting direction.

10. A system according to claim 1, wherein the labelling unit further comprises a label application unit configured for transporting the labels from the label printing unit to the objects and for applying the labels to the objects.

11. A system according to claim 1, wherein when the control unit causes the label printing unit to operate in the intermittent printing mode, and if the separation distance is greater than a predetermined second trigger distance value greater than the predetermined first trigger distance value, the control unit deactivates the label printing unit into a low energy mode.

12. A method for printing and applying labels to a flow of objects with a system comprising a labelling unit, an object transporting device, an object detection sensor, and a control unit, wherein the labelling unit comprises a label printing unit for printing labels to be applied to the objects, wherein the object transporting device is configured for transporting individual objects in a random flow to the labelling unit in an object transporting direction, wherein the object detection sensor is arranged upstream of the labelling unit and is configured for detecting a position of the objects when they are transported past the object detection sensor towards the labelling unit, the method comprising:

calculating, via the control unit, a separation distance separating a first one of the objects being transported on the object transporting device from a second one of the objects being transported on the object transporting device directly after the first object, wherein the separation distance is calculated by the control unit based on position detection by the object detection sensor of reference points between the first object and the second object;

if the separation distance is equal to or less than a predetermined first trigger distance value, causing the label printing unit to operate in a continuous printing mode, and, when the label printing unit operates in the continuous printing mode, printing labels to be applied to the objects; and if the separation distance is greater than the predetermined first trigger distance value, causing the label printing unit to operate in an intermittent printing mode, and, when the label printing unit operates in the intermittent printing mode, printing labels to be applied to the objects, wherein regardless of whether the label printing unit is operating in the continuous printing mode or the intermittent printing mode, the control unit causes the object transporting device to continue transporting the objects in the object transporting direction.

13. A method according to claim 12, wherein when the label printing unit operates in the intermittent printing mode, the method further comprises the step of: pausing the printing of labels between each subsequent label printing operation.

14. A system according to claim 3, wherein the control unit is configured to determine the continuous label printing output speed based on a transportation speed at which the individual objects are transported on the object transporting device.

15. A system according to claim 6, wherein the control unit is configured to determine the intermittent label printing output speed based on a transportation speed at which the individual objects are transported on the object transporting device.

16. A system according to claim 1, wherein the object transporting device comprises a conveyor belt driven by a drive unit.

17. A system according to claim 1, further comprising a single drive unit configured to drive the object transporting device.

18. A system for printing and applying labels to a flow of objects, the system comprising:

a labelling unit, an object transporting device, an object detection sensor, and a control unit, wherein the labelling unit comprises a label printing unit configured for printing labels to be applied to the objects, wherein the object transporting device is configured for transporting individual objects in a random flow to the labelling unit in an object transporting direction, wherein the object detection sensor is arranged upstream of the labelling unit and is configured for detecting a position of the objects when they are transported past the object detection sensor towards the labelling unit, wherein the control unit is configured to calculate a separation distance separating a first one of the objects being transported on the object transporting device from a second one of the objects being transported on the object transporting device directly after the first object, wherein the separation distance is calculated by the control unit based on position detection by the object detection sensor of reference points between the first object and the second object, wherein if the control unit calculates that the separation distance is equal to or less than a predetermined first trigger distance value, the control unit causes the label printing unit to operate in a continuous printing mode for printing labels to be applied to the objects, wherein if the control unit calculates that the separation distance is greater than the predetermined first trigger distance value, the control unit causes the label printing unit to operate in an intermittent printing mode for printing labels to be applied to the objects, and wherein the object transporting device consists of a single conveyor belt.

19. A system according to claim 18, further comprising a single drive unit configured to drive the single conveyor belt.

20. A system according to claim 19, wherein the single drive unit comprises a single motor.

* * * * *